United States Patent Office 2,762,168
Patented Sept. 11, 1956

2,762,168

METHOD OF INCREASING THE HEAT RESISTANCE OF GLASS FIBER WICKS

John E. McCutchen, Wichita, Kans., assignor to The Coleman Company, Inc., Wichita, Kans., a corporation of Kansas No Drawing. Application April 19, 1952,
Serial No. 283,234

8 Claims. (Cl. 49—77)

This invention relates to a method of increasing the heat resistance of glass fibers. The invention is particularly useful in the treating of capillary glass fibers and capillary wicks formed of glass fibers.

While glass fibers form an excellent capillary body and are useful for many purposes such as wicks, severe limitations on the use of this material have been imposed by reason of its relatively low melting temperature. Glass fibers melt at about 875° F. There has long been a need for a product having the excellent capillary qualities of glass fibers which would withstand considerably higher temperatures than the melting point indicated above.

An object of the present invention is to provide a method by which the fibers of fiber glass can be readily coated with a refractory material to raise significantly the melting point of fiber glass. A further object is to provide a method which is easily applicable to capillary glass fibers whereby upon drying and heating the product, a refractory material is deposited upon and caused to adhere to the glass. Other specific objects and advantages will appear as the specification proceeds.

In one embodiment of the invention, the fibers of a capillary fiber glass body are coated with a refractory compound to significantly increase the melting point of the fibers. In this process, as the glass softens with heat, the refractory material is absorbed at the surface and may partially alloy with the glass, forming a more heat-resistant compound.

The refractory material may be applied in several ways. One method of applying a coating of refractory oxide to each individual fiber, is to wet the fibers with a solution of a soluble salt capable upon decomposition of depositing a refractory oxide on the fiber. The fibers are then dried and heated to the decomposition point of the salt, when a uniform coating of oxide is deposited on the fiber. For example, a solution of thorium nitrate may be applied to the capillary material by simply immersing one end of the capillary material in the solution whereby the solution is drawn up about the individual fibers to coat them. Drying may be accomplished by natural drying or by heat, etc.

If desired, the capillary body may be centrifuged to remove surplus liquid. For example, wicking is supplied by the manufacturer in skeins of several hundred foot lengths. If it is desired to treat wicking in bulk several of these skeins would be soaked in thorium nitrate, then centrifuged to remove excess solution and leave a uniform coating on the fibers of the treated wicking. The wicking would then be dried at a relatively low temperature and treated with ammonia to convert the nitrate to an insoluble hydroxide. The wicking may then be cut to suitable lengths, assembled into the burner housing and heated to the decomposition point of thorium hydroxide depositing a coating of oxide on the filaments of fiber glass. The coating of oxide will then fuse with the glass as the heat is continued. The resulting product is found to have a very high resistance to heat and a capillary body of this character may be employed as a wick for supplying fuel where the temperatures of the wick exceed 1200° to 1500° F. It will be understood that any soluble compound which is decomposable by heat or chemicals into a refractory coating may be employed. A large number of nitrates may be used, such as, for example, cerium nitrate, thorium nitrate, and the rare earth nitrates such as neodymium, praseodymium, and lanthanum. Aluminum nitrates, magnesium nitrates and chromium nitrates may also be used. A large number of other refractory compounds other than those forming oxides may be used. I have found the nitrates extremely useful because they are soluble and decompose at low temperatures, depositing the oxides on the glass before the glass softens.

The quantity of the refractory material applied is controlled by the concentration of the soluble salt or centrifuging of the material or by a combination of the above methods.

The above procedure for increasing the heat resistance of glass fiber is especially valuable in the treatment of glass fiber filled sleeving used as a capillary medium for the distribution of fuel in a glass wick type burner. When used for this purpose, the sleeving may either be treated before assembly into the burner, or afterwards. If pre-treated, the sleeving may be impregnated in skeins, as above stated. When treated after assembly, the sleeving is cut to length and assembled into the burner tube, after which the ends are dipped into the salt solution and the capillarity of the sleeving distributes the liquid through the sleeving or wick. After low temperature drying, the wicks are adjusted and shaped to the desired position and the burner tubes and wicks heated to the proper temperature for decomposition of the salt and precipitation of the refractory material on the glass fibers.

In some cases, it is highly desirable to shape the wick so that the burning end of the wick extends in an angular position with respect to the main body of the wick. By bending the wick to a desired angular position after the solution has been applied and the wick dried, it is found that the heating of the wick to the point that the salt decomposes and the oxide or other refractory material coats the glass fibers, the wick is set into the desired shape.

While in the foregoing specification, I have set forth specific methods and steps therein in considerable detail for the purpose of illustrating embodiments of the invention, it will be understood that such details may be varied widely by those skilled in the art without departing from the spirit of my invention.

I claim:

1. In a process for treating glass fiber wicks consisting of a bundle of glass fibers, the steps of drawing into the wick through capillary attraction a solution containing a soluble salt decomposable into a refractory coating, decomposing the salt to deposit a refractory coating upon the fibers of glass, and heating the wick to alloy the glass with said refractory coating.

2. The process of claim 1, in which the salt is a nitrate.

3. The process of claim 1, in which the salt is thorium nitrate.

4. In a process for treating a capillary wick formed of glass fibers to increase the heat resistance thereof, the steps of applying to the wick by capillary action a solution of a soluble salt decomposable by heat into a refractory coating, whereby the fibers of the wick are coated with said solution, centrifuging to remove excess portions of the solution, and heating said wick to decompose the salt to deposit an oxide coating upon the fibers.

5. The process of claim 4, in which a portion of the wick is bent to an angular position prior to the heating step.

6. In a process for treating glass fiber wicks consisting of a bundle of glass fibers, the steps of drawing into the wick through capillary attraction a solution containing soluble salt decomposable into a refractory coating, heating said wick to decompose the salt to deposit a refractory coating upon the fibers thereof, and heating the glass fibers to alloy them with said refractory coating.

7. In a process for treating a capillary wick formed of glass fibers to increase the heat resistance thereof, the steps of applying to the wick by capillary action a solution of a soluble salt decomposable into a refractory coating, centrifuging to remove excess portions of the solution, decomposing the salt to deposit a refractory coating upon the fibers, and heating the wick to alloy the glass with the refractory coating.

8. In a process for treating glass fiber wicks consisting of a bundle of glass fibers, the steps of drawing into a wick through capillary attraction a solution containing a soluble salt decomposable into a refractory coating, and decomposing the salt to deposit a refractory coating upon the fibers of glass.

References Cited in the file of this patent

UNITED STATES PATENTS

| | | |
|---|---|---|
| 214,085 | Beck | Apr. 8, 1879 |
| 651,026 | Albrecht | June 5, 1900 |
| 943,488 | Terrell | Dec. 14, 1909 |
| 1,030,787 | Monosmith | June 25, 1912 |
| 2,197,866 | Kahn | Apr. 23, 1940 |
| 2,245,783 | Hyde | June 17, 1941 |
| 2,584,763 | Waggoner | Feb. 5, 1952 |

OTHER REFERENCES

Garner, W.: The Coloring of Glass Fibers, British Rayon and Silk Journal, January 1950, pages 74 and 75.